United States Patent
Haug

(10) Patent No.: US 7,562,313 B2
(45) Date of Patent: Jul. 14, 2009

(54) TIMESCALE SELECTION WINDOW FOR TEMPORAL SELECTION IN COMPUTER APPLICATIONS

(75) Inventor: Tobias Haug, Heidelberg (DE)

(73) Assignee: SAP AG, Walldorf (DE)

( * ) Notice: Subject to any disclaimer, the term of this patent is extended or adjusted under 35 U.S.C. 154(b) by 367 days.

(21) Appl. No.: 11/319,516

(22) Filed: Dec. 29, 2005

(65) Prior Publication Data

US 2007/0157090 A1 Jul. 5, 2007

(51) Int. Cl.
*G06F 3/033* (2006.01)
(52) U.S. Cl. ................. 715/854; 715/703; 345/157
(58) Field of Classification Search ........ 715/703, 715/853, 854, 771–773, 970, 730–732, 526, 715/765, 856–862, 764
See application file for complete search history.

(56) References Cited

U.S. PATENT DOCUMENTS 7,278,111 B2 * 10/2007 Stata et al. ............... 715/771
7,302,643 B1 * 11/2007 Edlund et al. ............. 715/703
2003/0234802 A1 * 12/2003 Makowski et al. ......... 345/703
2004/0212636 A1 * 10/2004 Stata et al. ................ 345/703
2005/0114777 A1 * 5/2005 Szeto .......................... 715/710
2006/0206522 A1 * 9/2006 Austin et al. ............ 707/104.1

OTHER PUBLICATIONS

A Conceptual Solution for Reprenting Time in Data Warehouse Dimensions Conferences in Research and Practice in Information Technology Series; vol. 166 archive Proceedings of the 3rd Asia-Pacific conference on Conceptual modelling; vol. 53 table of contents Hobart, Australia;pp. 45-54 ;Year of Publication: 2006; Authours: Elzbieta Malinowski.*

* cited by examiner

*Primary Examiner*—William L Bashore
*Assistant Examiner*—Meseker Takele
(74) *Attorney, Agent, or Firm*—Kenyon & Kenyon LLP

(57) ABSTRACT

A timescale selection window provides an application user interface, wherein the window includes a hierarchy of interactive selection zones. Each zone may display temporal information at a respective temporal granularity. User commands may be entered via the selection zone to select date ranges, to navigate among presented dates by units presented in the selection zones or to change granularities presented within the zones. As such, the timescale selection window provides a convenient user tool for navigation.

21 Claims, 3 Drawing Sheets

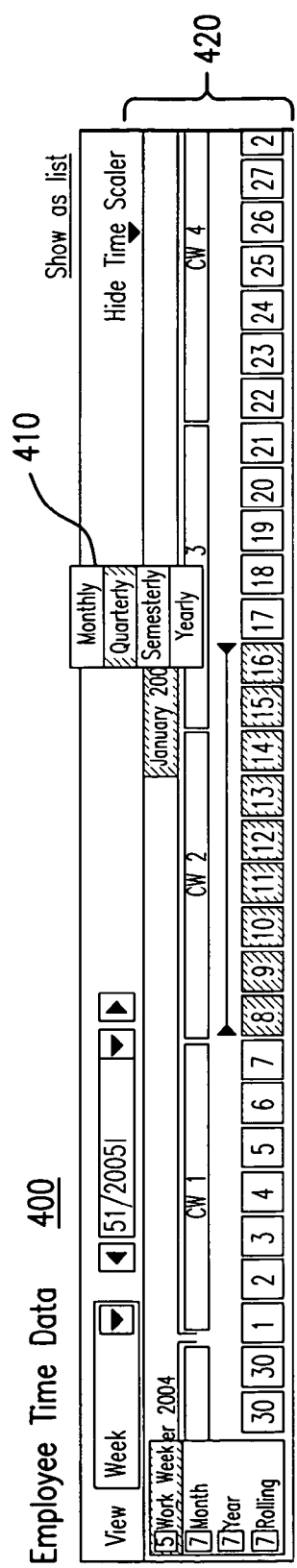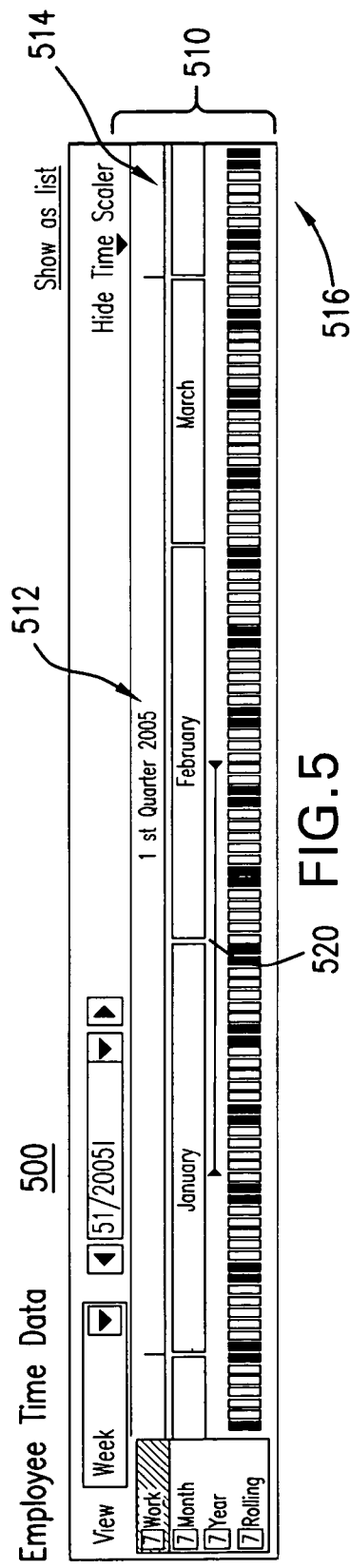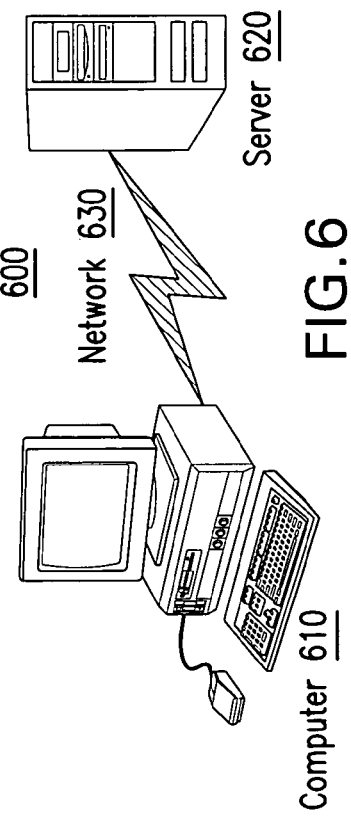

TIMESCALE SELECTION WINDOW FOR TEMPORAL SELECTION IN COMPUTER APPLICATIONS

BACKGROUND

The present invention provides a graphical navigation tool for use in computer applications through which operators may browse, navigate and select temporal ranges.

Graphical user interfaces are common in modern computing applications. They typically represent data as icons or other graphical objects that can be selected and modified by a computer's pointing device.

Various applications require user input that represents a selection of one or more dates. Personal information managers, for example, permit operators to select a date range and, in response thereto, display scheduling information contained within the selected range. Enterprise resource management applications may use operator selections of data ranges in various ways. Project scheduling applications permit operators to select and display date ranges and to define project milestones therein. Resource reservation systems permit operators to select and display date ranges, and then determine what resources are available within the specified time ranges. Various other implementations are possible.

In any of these instances, computer operators require a convenient mechanism to navigate among candidate dates and select date ranges that are appropriate to the operators' needs. Current tools do not provide a convenient mechanism to permit operators to browse through candidate date ranges at various levels of temporal granularity. Accordingly, there is a need in the art for an improved graphical user interface for browsing and selecting among date ranges in computer applications.

BRIEF DESCRIPTION OF THE DRAWINGS

FIG. 4 illustrates another exemplary timescale selection window according to an embodiment of the present invention.

FIG. 5 illustrates an additional exemplary timescale selection window according to an embodiment of the present invention.

FIG. 6 is a simplified block diagram of a computer system for use with various embodiments of the present invention.

DETAILED DESCRIPTION

Embodiments of the present invention provide a timescale selection window for an application user interface, wherein the window includes a hierarchy of interactive selection zones. Each zone may display temporal information at a respective temporal granularity. User commands may be entered via the selection zone to select date ranges, to navigate among presented dates by units presented in the selection zones or to change granularities presented within the zones. As such, the timescale selection window provides a convenient user tool for navigation.

Figure 1:
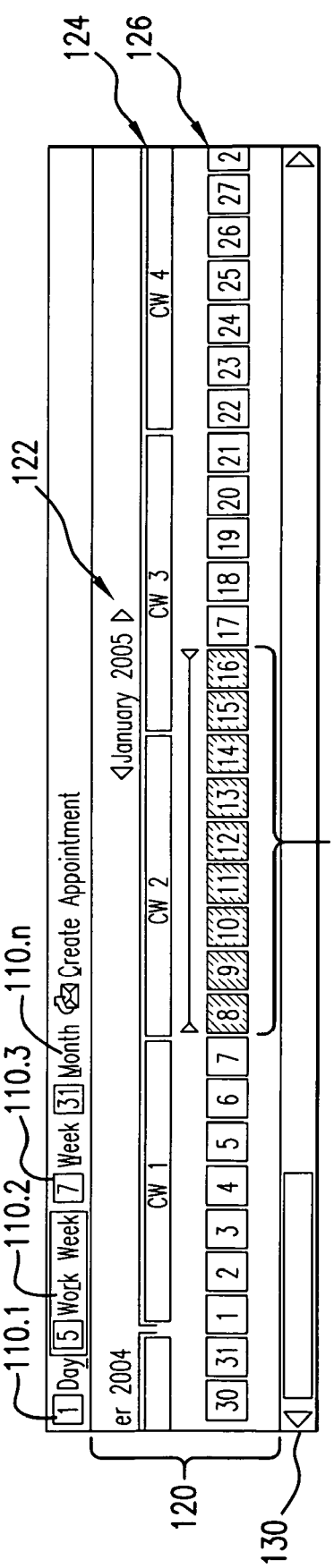
FIG. 1 illustrates an exemplary timescale selection window according to an embodiment of the present invention.

FIG. 1 illustrates a calendar control 100 according to an embodiment of the present invention. The calendar control 100 may be integrated into a user interface of an application to permit an operator to navigate to a time period of interest and to scale the time period to fit within the application window. As illustrated in FIG. 1, the calendar control 100 may include a plurality of view controls 110.1-110.n to permit an operator to toggle calendar views as desired. The calendar views themselves may be provided in another area of an application window (not shown) or in a substitute view (also not shown).

The calendar control 100 may include a timescale selection window 120, which provides a linear display of calendar information for quick navigation. The selection window 120 may include several navigation 'zones' 122-126 that permit rapid navigation to and selection of relevant time periods. Three such zones are illustrated in the example of FIG. 1, which permit navigation at a coarse granularity (monthly), an intermediate granularity (weekly) and a fine granularity (daily). Typically, the coarse and/or intermediate zones 122, 124 may be used to bring a relevant time period into display within the selection window 120 and the intermediate and/or fine granularity zones 124, 126 may be used to select specific dates within the display window for use by the application. The timescale selection window 120 also may include other controls, such as a slider 128, that permit an operator to slide the timescale within the selection window and display a desired time period.

In the example of FIG. 1, the dates of January 8-16 are shown as selected for display by the application, for example, in another pane of the user interface.

The calendar control 100 may be integrated for use within a variety of applications, such as personal information managers that manage appointments for individual users, project management applications that define project scheduling and resource management applications that permit firm resources to be shared among a variety of projects. The calendar control 100 may be integrated into any application that requires an operator to select a temporal period as an input to the application.

Figure 2:
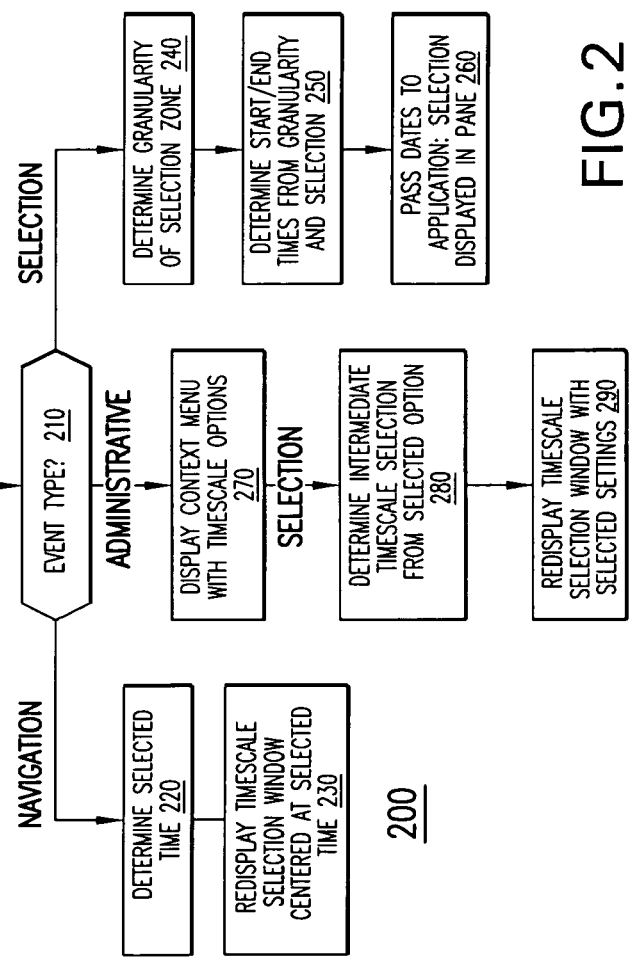
FIG. 2 illustrates a method according to an embodiment of the present invention.

FIG. 2 illustrates a method 200 according to an embodiment of the present invention. The method may be invoked in response to an event entered with respect to the application, resulting from user input. The method 200 may determine which type of event occurred (box 210). In response to user input that defines a navigation command, the method may identify a time element that has been selected by an operator (box 220) and redisplay contents of the timescale selection window to be centered on the selected time (box 230). For example, by clicking on navigation pointers on each month, an operator may jump the timescale selection window forward month-by-month. Similarly, by clicking on individual calendar weeks displayed in the intermediate selection zone (124 of FIG. 1), an operator may center the timescale selection window on the selected calendar weeks.

In response to an operator selection of a time period from the timescale selection window, the method may determine the granularity applied within the selection zone (box 240). The method 200 may determine start and end dates in response to the user's selection within the selection zone and the granularity applied therein (box 250). The method may pass the start and end dates to the remainder of the application (box 260). Typically, the selection causes the start and end dates to be displayed in another pane of the user interface.

Returning to the example of FIG. 1, an operator may enter a selection command by working with individual dates displayed in the fine granularity selection zone 126 of the timescale selection window 120. The operator may have positioned a cursor over a date corresponding to a start point of the selection (say, the box corresponding to January 16), clicked a command button, dragged the cursor laterally to an endpoint of the selection (the box corresponding to January 8) and released the command button once the cursor arrives at the endpoint. This click and drag functionality commonly indicates a selection operation in many graphical user interfaces. The method of FIG. 2 may interpret this data with reference not only to the selection operation but also the granularity being applied in the relevant selection zone.

Alternatively, an operator may have made a selection from an intermediate selection zone. If the same click and drag operation were performed with reference to the calendar week icons displayed in the intermediate selection zone 124 of FIG. 1, the method may determine start and end dates from the with reference to the selection operation and also the granularity applied in this selection zone.

Embodiments of the present invention also permit a selection command to be entered in the coarse granularity zone 122. The computer system may identify a date range corresponding to the increment displayed in the coarse zone 122. In the example of FIG. 1, a selection command made with respect to January 2005 may cause a selection of the date range extending from Jan. 1, 2005 to Jan. 31, 2005.

Returning to FIG. 2, the method 200 may determine that the event represents an administrative command. In such a case, the method 200 may display a context menu with a plurality of available timescale options (box 270). An operator may select an option from within the context menu for use as the coarse timescale. From the selection, the method may select an associated intermediate timescale (box 280). The method 200 may redisplay the timescale selection window using the selected settings (box 290). The fine granularity timescale may but need not be a daily view.

Figure 3:
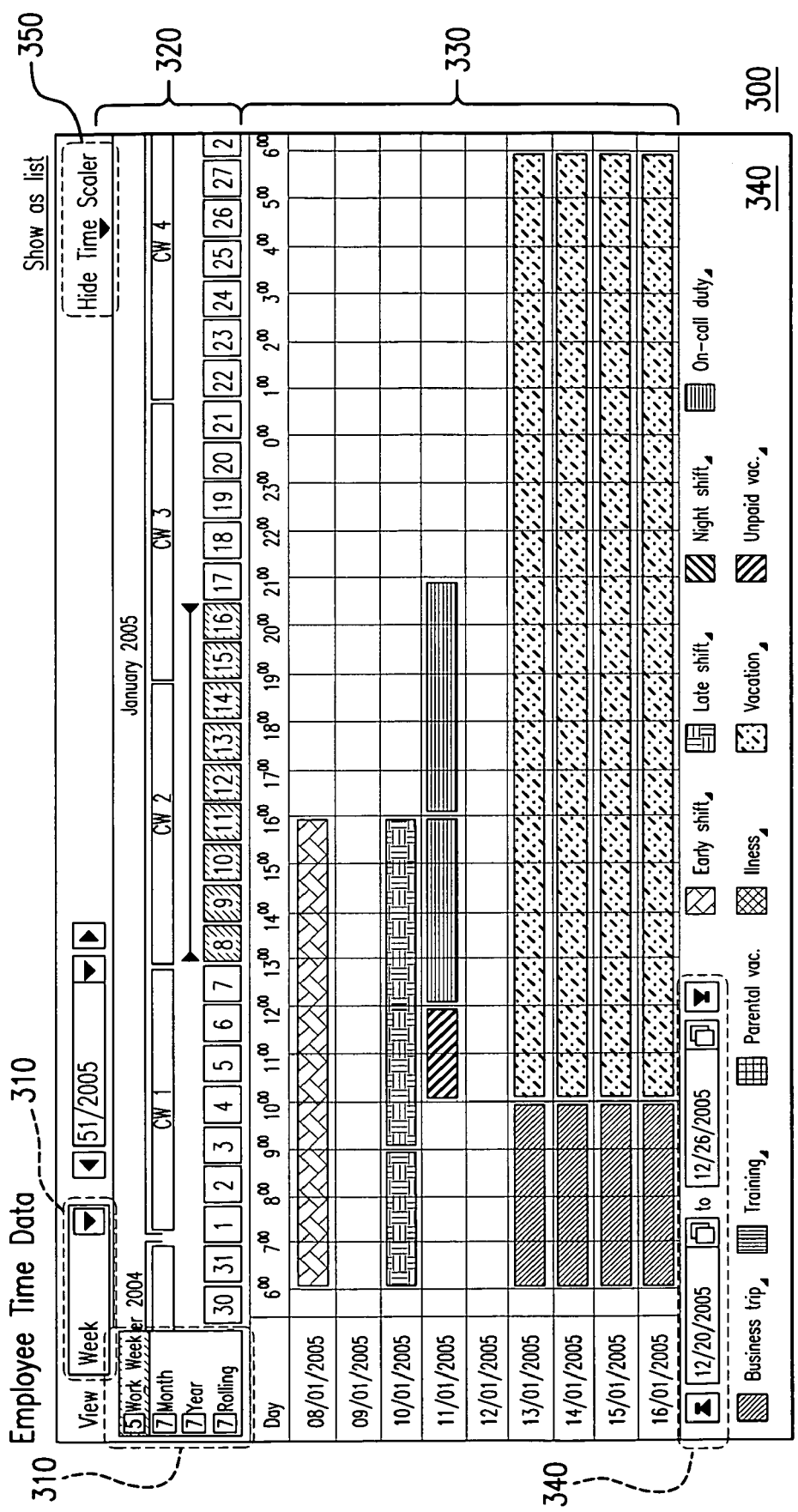
FIG. 3 illustrates an exemplary application window according to an embodiment of the present invention.

FIG. 3 illustrates an exemplary application window for a human resources application that includes a plurality of view switches 310, a timescale selection window 320 and a data pane 330. As in the example of FIG. 1, the timescale selection window 320 illustrates a selection of a time period—here, from Jan. 8-16, 2005—which causes display of application data within the selected time period in a data pane 330. In the example of FIG. 3, the application data represents employee scheduling data presented in the form of a Gantt chart. The application interface may be integrated with other date selection tools, such as interactive pull up menus 340.

In an embodiment, the timescale selection window 320 may include a selection tool 350 to selectively hide or reveal the window 320. After an operator completes navigation, if the user determines that there is no further need to perform additional navigation operations, then the operator may minimize the timescale selection window to maximize screen area for other operations such as the data pane 330.

In another embodiment, the application may minimize the timescale selection window 320 automatically after the application measures a predetermined period of operator inactivity with respect to the window 320. The application may resume display of the timescale window 320 if application events indicate activity with respect to the window, such as a mouse over, a user's click or other affirmative action from the user.

FIG. 4 illustrates an exemplary user interface 400 with a context menu illustrated 410. The context menu 410 may be invoked by, for example, right clicking on the month indicator using a mouse or other pointing device. The context menu illustrates a plurality of time scale increments for use in the coarse timescale. In this example, the context menu permits an operator to select among monthly, quarterly, "semesterly" or yearly increments.

FIG. 5 illustrates an exemplary user interface 500 in which a timescale selection window 510 displays a quarterly view in a coarse granularity zone 512. In this example, the intermediate granularity zone 514 may be displayed in monthly increments and the fine granularity zone 516 may be displayed still in daily increments. User selection of the range January 16 to February 15 is illustrated with a selection indicator 520.

FIG. 6 is a simplified block diagram of a computer network 600 suitable for use with the present invention. The network may include one or more computers 610 and servers 620 interconnected via a network fabric 630. The computers 610 may include processors, memory devices and input/output devices (not shown individually) and may execute various program instructions that manage their operation. Some program instructions may define an operating system for the computer, while other program instructions may define various applications such as personal information managers, word processors, spreadsheet applications, browsers and enterprise resource management applications, among others. The timescale selection window of the present invention may find use in various applications in which calendar operations are used. As such, the timescale selection window may be represented by program instructions that are stored in the computer's memory system.

Computers 610 may be integrated into a larger network and provided in communication with network servers 620. In such instances, the servers 620 may execute applications and present data to the computers 610 as part of their operations. In one embodiment, the computer and server may communicate via portal-based communication sessions. In this operation, the timescale selection tools may be presented to a computer via a browser based interface. As such, the timescale selection window may be represented by program instructions that are stored in the server's memory system.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

I claim:

1. An article of manufacture comprising a computer memory system containing program instructions for entering temporal information to an application according to the method of:

displaying a timescale selection window in an application user interface, wherein the window concurrently includes a coarse granularity selection zone displaying a coarse timescale in coarse granularity increments, an intermediate granularity selection zone displaying an intermediate timescale in intermediate granularity increments that are subsets of respective coarse granularity increments, and a fine granularity selection zone displaying a fine timescale in fine granularity increments that are subsets of respective intermediate granularity increments, and wherein each zone covers a common span of time and is located in a discrete region of the timescale selection window;

responsive to a first user selection command entered via the coarse granularity selection zone, changing a time period displayed in the intermediate selection zone;

responsive to a second user selection command entered via the intermediate granularity selection zone, changing a time period displayed in the fine granularity selection zone; and, responsive to positioning a cursor over a first granular element corresponding to a start point, clicking a command button, dragging the cursor to a second granular element corresponding to an end point, and releasing the command button, passing temporal information represented by the start point and the end point to the application, wherein the positioning of the cursor over the first or second granularity element can be done in either the intermediate granularity selection zone or the fine granularity selection zone.

2. The article of claim 1, wherein the granularity of the temporal information passed to the application is dependent upon the granularity of the selection zone of the start point and the end point.

3. The article of claim 1, wherein the coarse granularity selection zone displays linear temporal ranges in yearly increments.

4. The article of claim 1, wherein the intermediate granularity selection zone displays linear temporal ranges in monthly increments.

5. The article of claim 1, wherein the fine granularity selection zone displays linear temporal ranges in daily increments.

6. The article of claim 1, further comprising displaying application data relevant to the passed temporal information.

7. The article of claim 1, further comprising adjusting granularities of the selection zones based on a user command.

8. The article of claim 1, further comprising, responsive to a change in a range of granularity increments displayed in the timescale selection window, selecting an individual granularity increment in the coarse, intermediate, or fine granularity selection zones from a group containing every coarse, intermediate, and fine granularity increment within the range of the granularity increments displayed in the timescale selection window to thereby retrieve application data corresponding to the selected granularity increment.

9. Computer readable medium having program instructions stored thereon that, when executed cause a device to:
 display a timescale selection window in an application user interface, wherein the window concurrently includes a coarse granularity selection zone displaying a coarse timescale in coarse granularity increments, an intermediate granularity selection zone displaying an intermediate timescale in intermediate granularity increments that are a subset of respective coarse granularity increments, and a fine granularity selection zone displaying a fine timescale in fine granularity increments that are a subset of respective intermediate granularity increments, and wherein each zone and timescale is adjustable individually and separately from the other zones covers a common span of time and is located in a discrete region of the timescale selection window;
 change a time period displayed in the intermediate selection zone in response to a first user selection command entered via the coarse granularity selection zone;
 change a time period displayed in the fine granularity selection zone in responsive to a second user selection command entered via the intermediate granularity selection zone; and,
 pass temporal information represented by a start point and an end point to the application responsive to positioning a cursor over a first granularity increment corresponding to a the start point, clicking a command button, dragging the cursor to a second granularity increment corresponding to the end point, and releasing the command button, passing temporal information represented by the start point and the end point to the application, wherein the positioning of the cursor over the first or second granularity increment can be done in either the intermediate granularity selection zone or the fine granularity selection zone.

10. The computer readable medium of claim 9, wherein the granularity of the temporal information passed to the application is dependent upon the granularity of the selection zone of the start point and the end point.

11. The computer readable medium of claim 9, wherein the coarse granularity selection zone is linearly adjustable in yearly increments.

12. The computer readable medium of claim 9, wherein the intermediate granularity selection zone is linearly adjustable in monthly increments.

13. The computer readable medium of claim 9, wherein the fine granularity selection zone is linearly adjustable in daily increments.

14. The computer readable medium of claim 9 having additional instructions stored thereon that, when executed cause the device to:
 display application data relevant to the passed temporal information.

15. The computer readable medium of claim 9 having additional instructions stored thereon that, when executed cause the device to:
 adjust granularities of the selection zones in response to a user command.

16. The computer readable medium of claim 9, further comprising, responsive to a change in a range of granularity increments displayed in the timescale selection window, selecting an individual granularity increment in the coarse, intermediate, or fine granularity selection zones from a group containing every coarse, intermediate, and fine granularity increment within the range of the granularity increments displayed in the time scale selection window to thereby retrieve application data corresponding to the selected granularity increment.

17. An article of manufacture comprising a computer memory system containing program instructions for displaying application data within a selected temporal range according to the method of:
 displaying a timescale selection window in an application user interface, wherein the window concurrently includes a coarse granularity selection zone displaying a coarse timescale in coarse granularity increments, an intermediate granularity selection zone displaying an intermediate timescale in intermediate granularity increments that are a subset of respective coarse granularity increments, a fine granularity selection zone displaying a fine timescale in fine granularity increments that are a subset of respective intermediate granularity increments, and a view switch containing a temporal range, and wherein each zone covers a common span of time and is located in a discrete region of the timescale selection window;
 responsive to a first user selection command entered via the coarse granularity selection zone, changing a time period displayed in the intermediate selection zone;
 responsive to a second user selection command entered via the intermediate granularity selection zone, changing a time period displayed in the fine granularity selection zone;
 responsive to a third user selection command entered via the view switch, changing the display of application data to show data encompassing the selected temporal range; and
 responsive to positioning a cursor over a granular element in the coarse, intermediate, or fine selection zones and clicking a command button, changing the display of application data to show data encompassing to the selected granular element and the surrounding selected temporal range.

18. The article of claim 17, wherein the selected granular element is a specified day, a specified month, or a specified year.

19. The article of claim 17, wherein the temporal range in the view switch is selected from the group consisting of a day, work week, week, month, year, and rolling.

20. The article of claim 17, wherein the view switch contains at least two different temporal ranges from which a desired temporal range can be selected.

21. The article of claim 17, further comprising, responsive to a change in a range of granularity increments displayed in the timescale selection window, selecting an individual granularity increment in the coarse, intermediate, or fine granularity selection zones from a group containing every coarse, intermediate, and fine granularity increment within the range of the granularity increments displayed in the timescale selection window to thereby retrieve application data corresponding to the selected granularity increment.

* * * * *